Patented Dec. 12, 1944

2,365,056

UNITED STATES PATENT OFFICE 2,365,056

INSECTICIDAL AND FUNGICIDAL MATERIALS

Gerald H. Coleman and Gerald A. Griess, Midland, Mich., assignors to The Dow Chemical Company, Midland, Mich., a corporation of Michigan No Drawing. Application October 30, 1943, Serial No. 508,376

11 Claims. (Cl. 167—31)

The present invention is concerned with new insecticidal and fungicidal materials and is particularly directed to compositions comprising as active toxic ingredients certain amine salts of dinitrophenols and to the compounds so employed.

Phenols, and particularly dinitrophenols and their metal salts, have been widely employed as constituents of insecticidal and fungicidal compositions. Under certain conditions, these compounds have been found satisfactory toxicants for the destruction of a wide range of parasitic organisms. In these applications the phenolic toxicant frequently has been employed in soluble form and dissolved either in water or in organic solvent such as petroleum oil, kerosene, and the like.

In the provision of parasiticidal materials for use on plants, seeds, fruit, and the like, the susceptibility of the host to injury is a controlling factor in the selection of the toxicant and type of composition to be employed. The indiscriminate use of free nitrophenols and their inorganic salts is impractical because of the phytotoxic properties of many such compounds, whereby leaves, flowers, fruit, and buds may be severely injured on contact therewith. Also, the solubility characteristics of the common metal salts of dinitrophenols and of certain of the phenols themselves are not favorable where it is desired to maintain the toxicant in contact with or adjacent to the area of parasite infestation. Rain, heavy dew, subsequent spraying, or irrigation rapidly disperse such toxicant, whereby a continued effect is not obtained. The failure of the free dinitrophenols to provide protection over an extended period of time is attributable in part to their volatility. It is apparent, therefore, that many of the substances commonly employed in insecticidal and fungicidal practice are not adapted for general use in those situations which involve contact with plant tissue or where a prolonged effect is desired.

In the selection of toxicants for general parasiticidal use, and more particularly agricultural application, it is desirable that materials be chosen which have such properties as not to be rapidly dissipated from the point of application, whereby the development and growth of insects, bacteria, and fungus organisms is controlled over a long period of time. It is also desirable that the chosen toxicants be non-corrosive to growing plants and relatively innocuous to humans.

We have discovered that improved insecticidal and fungicidal compositions are obtained when an inert diluent is compounded with certain amine salts of dinitrophenols. These salts are in themselves novel and are characterized by the following formula:

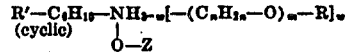

wherein R represents an aromatic radical of the benzene series, R' is an alkyl radical containing from 1 to 8 carbon atoms, inclusive, a phenyl, cyclohexyl, or hydrogen radical, $w$ is an integer not greater than 2, $m$ is an integer not greater than 4, $n$ is an integer from 2 to 4, inclusive, and —O—Z represents a substituted phenoxy radical derived from a phenol of the benzene series characterized by nuclear-substituted nitro groups in the para-position and in one of the positions ortho- to the hydroxyl radical. Preferred embodiments of the invention include insecticidal and fungicidal compositions embodying compounds of the above formula, wherein R'$C_6H_{10}$— represents cyclohexyl, R represents a chlorophenyl radical, $n$ is 2, and —O—Z represents the radical

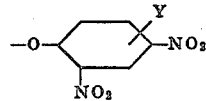

wherein Y represents a phenyl, cyclohexyl, or alkyl radical containing from 1 to 8 carbon atoms, inclusive.

The expression "of the benzene series" as applied to aromatic and nitrophenolic radicals refers to mono-nuclear aromatic structures characterized by the phenyl ring and homologues and analogues thereof in distinction to heterocyclic structures and condensed polynuclear radicals containing several benzene nuclei linked together in such manner that each pair possesses 2 carbon atoms in common as in naphthyl, phenanthryl, etc.

The new amine salts, as described in the foregoing formula, are either crystalline or resinous compounds and are all characterized by being less than 0.075 per cent soluble in water at 25° C. This property, coupled with the low volatility of the compounds, renders deposits thereof in or on parasite infested surfaces persistent and not inclined to be leached out by water or otherwise dissipated. The toxic effect exerted by compositions containing these salts in mixture with inert diluents is thereby extended over an appreciable period. Also, many of the new salt compounds are substantially less toxic to growing vegetation than are the corresponding free nitrophenols or their metallic salts, and have not been observed as exerting any undesirable effect upon the skin of humans and warm-blooded animals. The compounds and compositions in which they are employed are very effective against a wide range of organisms. This would appear to result from the association in a single molecule of two aromatic-oxy groups as represented by Z—O— and R—O—, and the highly substituted cyclohexyl-ammonium radical.

The compounds as set forth above may be employed generally as toxicants in insecticidal and fungicidal mixtures. They may be used as constituents of either dusting or spraying compositions. Thus, they may be compounded with various finely-divided inert diluents such as diatomaceous earth, bentonite, talc, sulfur, wood flours, inorganic phosphates, clays and the like to form dusts adapted to be applied to plants or other insect or fungus infested objects and surfaces with standard dusting equipment, or otherwise applied as in seed disinfection, etc. If desired, such dusts may be employed as concentrates and subsequently modified with additional finely-divided carrier or suspended in water or other liquid diluent to form sprays. The amine addition salts may also be incorporated with various wetting, dispersing, and sticking agents, and subsequently diluted to produce spray or dust compositions in which the salt is present in any desired concentration.

In the preparation of concentrates, from about 3 to about 80 per cent of the amine salt is commonly employed. The concentration of the salt in the ultimate spray or dust composition is generally between about 0.001 per cent and 10.0 per cent by weight. For seed disinfection and certain other fungicidal uses, the concentration of the toxicant may run as high as 80 per cent. The composition type in which the salt is employed and the concentration thereof in the final composition are dependent upon the particular insect, bacteria, or fungi to be controlled and the circumstances under which such control is to be accomplished.

In other embodiments of the invention, the amine sales may be employed in combination with oil emulsions. They may also be employed in water suspension with or without an additional emulsifying, wetting, or dispersing agent. The amine salt may similarly be incorporated in other standard type insecticidal, fungicidal, and bactericidal compositions either as the sole toxic ingredient of such mixture or in combination with such materials as inorganic pigments, organic dyes, sulfur, copper sprays, lead arsenate, zinc sulfide, pyrethrum, rotenone, organic thiocyanates, and the like.

The several examples are illustrative with respect to the particular compounds, composition types, and concentrations employed but are not to be construed as limiting the invention.

Example 1

A series of determinations were carried out in which a number of the amine salt compounds were dispersed on a diatomaceous earth product, marketed as "Celite," and employed in aqueous dispersion for the control of bean mildew on bean foliage. In a representative preparation, 20 parts by weight of N-[3-(4-chlorophenoxy)-2-methyl-propyl] cyclohexylamine salt of 2-cyclohexyl-4.6-dinitro-phenol was dissolved in acetone and this solution used to moisten 80 parts by weight of the diatomaceous earth. The wet product was mixed and thereafter dried to remove the acetone. 2.5 pounds of the resulting dust (0.5 pound of toxicant) and 0.25 pound of sodium lauryl sulfate were then dispersed in 100 gallons of water and this spray composition applied directly to bean foliage for the control of mildew. The results obtained with representative salt compounds when employed in this manner, are summarized in the following table:

Table I

| Compound | Pounds per 100 gallons | Per cent effectiveness | Per cent injury |
|---|---|---|---|
| Beta-(4-cyclohexyl-phenoxy)-beta'-cyclohexylamino-diethyl ether salt of 2-cyclohexyl-4.6-dinitro-phenol | 0.5 | 97 | |
| N-[2-(2-xenoxy)-ethyl] 2-methylcyclohexylamine salt of 2.4-dinitro-phenol | 0.5 | 93 | |
| N-[3-(4 chlorophenoxy)-2-methyl-propyl] cyclohexylamine salt of 2-cyclohexyl-4.6-dinitro-phenol | 0.5 | 100 | 0 |
| Beta-phenoxy-beta'-cyclohexylamino-diethyl ether salt of 2-secondarybutyl-4.6-dinitro-phenol | 0.5 | 90 | 2.0 |
| Beta-(4-chlorophenoxy)-beta'-cyclohexylamino-diethyl ether salt of 2-secondarybutyl-4.6-dinitro-phenol | 0.5 | 100 | 0 |
| N-[3-(4-tertiarybutyl-phenoxy)-2-methyl-propyl] cyclohexylamine salt of 2-secondarybutyl-4.6-dinitro-phenol | 0.5 | 100 | 0 |
| N-[3-(4-chlorophenoxy)-2-methyl-propyl] cyclohexylamine salt of 2-secondarybutyl-4.6-dinitro-phenol | 0.5 | 100 | 0 |
| N-[3-(4-tertiarybutyl phenoxy)-2-methyl-propyl] cyclohexylamino salt of 2-cyclohexyl-4.6-dinitro-phenol | 0.5 | 100 | 0 |
| N.N-di-[2-(4-chlorophenoxy)-ethyl] cyclohexylamine salt of 2-cyclohexyl-4.6-dinitro-phenol | 0.5 | 96 | 1.0 |
| N-[2-(4-chlorophenoxy)-ethyl] cyclohexylamine salt of 2-cyclohexyl-4.6-dinitro-phenol | 1.5 | 86 | 0 |

Example 2

In a similar fashion, dispersions of the amine salts on diatomaceous earth were employed to prepare spray mixtures for the control of snapdragon rust on snapdragon foliage. In preparing such spray compositions sufficient of the dust concentrate to give 1.0 pound of the amine salt and 0.5 pound of sodium lauryl sulfate were employed per 100 gallons. The N-[3-(4-tertiarybutyl - phenoxy)-2-methyl - propyl] cyclohexylamine salt of 2-secondarybutyl-4.6-dinitro-phenol gave a control of 93 per cent. The corresponding amine salt of 2-cyclohexyl-4.6-dinitro-phenol gave a control of 94 per cent.

Example 3

The amine salts of dinitrophenols were employed for the control of red spider. In these determinations 16.6 parts by weight of the amine salt, 66.7 parts of diatomaceous earth, and 16.6 parts of sodium lauryl sulfate were ground together to produce an insecticidal concentrate. Sufficient of this mixture was then dispersed in water to give a concentration of 0.25 pound of the amine salt per 100 gallons of spray mixture. The compositions so obtained were applied to bean foliage infested with red spider to obtain high kills of this pest without any injury whatever to the host plant. The following table sets forth the results obtained with representative salt compounds:

Table II

| Compound | Per cent control |
|---|---|
| N.N-di-[2-(4-chlorophenoxy)-ethyl] cyclohexylamine salt of 2-cyclohexyl-4.6-dinitro-phenol | 100 |
| N-[3-(4-chlorophenoxy)-2-methyl-propyl] cyclohexyl-amine salt of 2-secondarybutyl-4.6-dinitro-phenol | 93 |
| Beta-(4-chlorophenoxy)-beta'-cyclohexylamino-diethyl ether salt of 2-secondarybutyl-4.6-dinitro-phenol | 96 |
| Beta-phenoxy-beta'-cyclohexylamino-diethyl ether salt of 2-secondarybutyl-4.6-dinitro-phenol | 96 |

EXAMPLE 4

The amine salts were employed as constituents of spray mixtures for the control of southern army worm on cranberry bean foliage. In this operation 19.1 parts by weight of the amine salt, 76.1 parts of diatomaceous earth, and 4.8 parts of sodium lauryl sulfate were ground and mixed together to form the basic composition. Sufficient of this concentrate was dispersed in water to give a mixture containing 1.0 pound of the amine salt per 100 gallons. The spray compositions so obtained gave high kills against southern army worm without causing any injury to the bean foliage. In comparative determinations lead arsenate at 3 pounds per 100 gallons gave substantially no control against the southern army worm and caused appreciable plant injury. The following table is illustrative with respect to the results obtained:

Table III

| Compound | Per cent control |
| --- | --- |
| N-[3-(4-tertiarybutyl-phenoxy)-2-methyl-propyl] cyclohexylamine salt of 2-cyclohexyl-4.6-dinitro-phenol | 80 |
| N-[3-(4-tertiarybutyl-phenoxy)-2-methyl-propyl] cyclohexylamine salt of 2-secondarybutyl-4.6-dinitro-phenol | 100 |
| Beta-phenoxy-beta'-cyclohexylamino-diethyl ether salt of 2-secondarybutyl-4.6-dinitro-phenol | 80 |
| Beta-phenoxy-beta'-cyclohexylamino-diethyl ether salt of 2-cyclohexyl-4.6-dinitro-phenol | 100 |
| Beta-(4-chlorophenoxy)-beta'-cyclohexylamino-diethyl ether salt of 2-cyclohexyl-4.6-dinitro-phenol | 100 |
| N-[3-(4-chlorophenoxy)-2-methyl-propyl] cyclohexylamine salt of 2-cyclohexyl-4.6-dinitro-phenol | 100 |

EXAMPLE 5

Parasiticidal concentrates comprising the amine salts of the dinitrophenols as toxic ingredients are illustrated by the following:

| Compound | Parts by weight |
| --- | --- |
| COMPOSITION A | |
| N-[3-(2-methyl-5-isopropyl-phenoxy)-propyl] 4-cyclohexyl-cyclohexylamine salt of 2-normaloctyl-4.6-dinitro-phenol | 15 |
| Pine oil | 40 |
| Sodium salt of sulfonated sperm oil | 45 |
| COMPOSITION B | |
| Beta-[2-(2.4.5-trichlorophenoxy)-ethoxy]-beta'-cyclohexylamino-diethyl ether salt of 2-methyl-4.6-dinitro-phenol | 25 |
| Bentonite | 60 |
| Sodium lauryl sulfate | 15 |
| COMPOSITION C | |
| N-[4-(4-tertiaryoctyl-phenoxy)-normalbutyl] cyclohexylamine salt of 2-phenyl-4.6-dinitro-phenol | 50 |
| Sodium lauryl sulfate | 50 |
| COMPOSITION D | |
| Gamma-(2-phenyl-monochlorophenoxy)-gamma'-(4-phenyl-cyclohexylamino)-dipropyl ether salt of 2-chloro-4.6-dinitro-phenol | 15 |
| Bentonite | 70 |
| Sodium salt of sulfonated 2-phenyl-isopropyl-phenol | 15 |

The foregoing compositions may be diluted with water to obtain spray mixtures adapted to be applied for the disinfection of stables, chicken yards, soil adjacent to growing plants, and the like. These concentrates may also be employed in dilute aqueous dispersion, with or without oil, for dormant spray application for the control of apple scab, aphis, scale, etc.

EXAMPLE 6

Mixtures for application by conventional dusting procedures for control of plant parasites are as follows:

| Compound | Parts by weight |
| --- | --- |
| COMPOSITION E | |
| N.N-di-[2-(2-(2-(4-iodophenoxy)-ethoxy)-ethoxy)-ethyl] cyclohexylamine salt of 3-cyclohexyl-4.6-dinitro-phenol | 5 |
| Sulfur | 95 |
| COMPOSITION F | |
| Delta-(2-benzyl-phenoxy)-delta'-(4-normaloctyl-cyclohexylamino)-dinormalbutyl ether salt of 3-phenyl-4.6-dinitro-phenol | 3 |
| Petroleum oil | 1 |
| Walnut shell flour | 96 |
| COMPOSITION G | |
| Beta-[2-(2.4-dibromophenoxy)-ethoxy]-beta'-[2-(4-tertiarybutyl-cyclohexylamino)-ethoxy]-diethyl ether salt of 3-methyl-4.6-dinitro-phenol | 3 |
| Pyrethrum | 0.1 |
| Diatomaceous earth | 96.9 |
| COMPOSITION H | |
| N.N-di-[2-(2-(2-(4-chlorophenoxy)-ethoxy)-ethoxy)-ethyl] cyclohexylamine salt of 2-normalhexyl-4.6-dinitro-phenol | 3 |
| Rotenone | 0.01 |
| Diatomaceous earth | 96.99 |
| COMPOSITION I | |
| N.N-di-[2-(2-phenoxy-ethoxy)-ethyl] cyclohexylamine salt of 2-cyclohexyl-4.6-dinitro-phenol | 5 |
| Red talc | 95 |

The above and related compositions may be dusted on tree and plant surfaces for the control of citrus red mite, European red mite, southern army worm, thrips, snapdragon rust, etc.

The new chemical compounds to be employed in accordance with the foregoing examples are readily prepared by warming together a free dinitrophenol and a suitable amine. If desired, such reaction can be carried out in an inert organic solvent for the reactants. The temperature of reaction is not critical although best results are obtained at temperatures between 30° C. and the decomposition temperature of the reactants and amine salt product. The reaction is preferably carried out by adding one of the reactants portion-wise to the other with stirring and thereafter heating if necessary to bring about the salt formation. The crude reaction products so obtained are adapted to be employed as constituents of insecticidal and fungicidal compositions without further purification. However, the majority of the salts are crystalline in nature and are readily isolated in substantially clear form by crystallization from benzene, toluene, alcohol, or other suitable organic solvent. Where it is desired to impregnate solid carriers with the amine salt, the carrier may be introduced into the salt reaction mixture and the phenolate precipitated directly in and on the carrier surfaces. An alternate procedure consists in first wetting a solid finely-divided carrier with one of the toxicants, e. g. the dinitrophenol, dissolved in a suitable organic solvent, and thereafter contacting the mixture with a solution of the second reactant, e. g. the amine, to produce the desired compound in situ.

The following examples are illustrative of the preparation of our new amine salts.

EXAMPLE 7—N-[2-(2-XENOXY)-ETHYL]2-METHYLCYCLOHEXYLAMINE SALT OF 2.4-DINITRO-PHENOL 18.4 grams (0.1 mole) of 2.4-dinitrophenol and 30.9 grams (0.1 mole) of N-[2-(2-xenoxy)-ethyl]2-methlycyclohexylamine were mixed together and heated to produce a dark red liquid. This product was cooled to obtain a quantitative yield of the N-[2-(2-xenoxy)-ethyl]2-methylcyclohexylamine salt of 2.4-dinitro-phenol as a dark colored amorphous solid soluble in 95 per cent ethanol and carbon tetrachloride and insoluble in kerosene. This salt product was soluble in water at 25° C. to the extent of 0.0547 gram per 100 grams of solution. At 30.8° C., the saturated aqueous solution had a pH of 5.15.

EXAMPLE 8—BETA-(4-CYCLOHEXYL-PHENOXY)-BETA'-CYCLOHEXYLAMINO-DIETHYL ETHER SALT OF 2-CYCLOHEXYL-4.6-DINITRO-PHENOL 26.6 grams (0.1 mole) of 2-cyclohexyl-4.6-dinitro-phenol and 34.5 grams (0.1 mole) of beta-(4-cyclohexylphenoxy)-beta'-cyclohexylamino-diethyl ether were mixed with 20 milliliters of benzene. Heat of reaction was evolved. An additional 80 milliliters of benzene was added to the mixture and the latter heated to boiling temperature and thereafter cooled, whereupon the desired salt compound precipitated as a yellow crystalline solid. This precipitate was separated by filtration, washed with cold benzene, and air-dried to obtain 59 grams of the beta-(4-cyclohexylphenoxy)-beta'-cyclohexylamino-diethyl ether salt of 2-cyclohexyl-4.6-dinitro-phenol as bright orange crystal melting at 101°-103.5°. This salt is soluble in 95 per cent ethanol, carbon tetrachloride, and hot kerosene. In water at 25° C. the compound is soluble to the extent of 0.0081. The saturated aqueous solution at 34.5° C. has a pH of 6.6.

EXAMPLE 9—N-[2-(4-CHLOROPHENOXY)-ETHYL]CYCLOHEXYLAMINE SALT OF 2-CYCLOHEXYL-4.6-DINITRO-PHENOL

In a similar manner 25.5 grams (0.1 mole) of N-[2-(4-chlorophenoxy)-ethyl]cyclohexylamine, 25.2 grams (0.1 mole) of 2-cyclohexyl-4.6-dinitro-phenol, and 75 grams of benzene were reacted together to obtain 47 grams of N-[2-(4-chlorophenoxy)-ethyl]cyclohexylamine salt of 2-cyclohexyl-4.6-dinitro-phenol as a bright orange powder melting at 166°-168° C., soluble in 95 per cent ethanol and acetone, and very slightly soluble in kerosene. This salt is soluble in water to the extent of 0.0076 gram per 100 grams of solution at 25° C. The pH of the saturated aqueous solution at this temperature is 8.0.

EXAMPLE 10—N.N-DI-[2-(4-CHLOROPHENOXY)-ETHYL]CYCLOHEXYLAMINE SALT OF 2-CYCLOHEXYL-4.6-DINITRO-PHENOL 20.4 grams (0.05 mole) of N.N-di-[2-(4-chlorophenoxy)-ethyl]cyclohexylamine, 13.3 grams (0.05 mole) of 2-cyclohexyl-4.6-dinitro-phenol, and 47 milliliters of 95 per cent ethanol were mixed together and heated to boiling temperature, whereupon a clear red solution was formed. Upon cooling and standing, a red oil separated and slowly crystallized upon standing. The solid crude product was recovered by filtration, washed with cold ethanol, and air-dried to obtain 33.0 grams of the N.N-di-[2-(4-chlorophenoxy)-ethyl]cyclohexylamine salt of 2-cyclohexyl-4.6-dinitro-phenol as bright yellow crystals melting at 178°-182° C. and soluble in ethanol, carbon tetrachloride, and kerosene. In water at 25° C. this salt compound was soluble to the extent of 0.0072 gram per 100 grams of solution. The pH of the saturated aqueous solution at this temperature was 5.52.

EXAMPLE 11—BETA-PHENOXY-BETA'-CYCLOHEXYLAMINO-DIETHYL ETHER SALT OF 2-SECONDARY-BUTYL-4.6-DINITRO-PHENOL

In a manner similar to that described in the preceding example 12 grams (0.05 mole) of 2-secondary butyl-4.6-dinitro-phenol and 13.2 grams (0.05 mole) of beta-phenoxy-beta'-cyclohexylamino-diethyl ether were reacted together in 95 per cent ethanol. There was obtained from this reaction 22.6 grams of beta-phenoxy-beta'-cyclohexylamino-diethyl ether salt of 2-secondary butyl-4.6-dinitro-phenol as yellow crystals melting at 106°-108° C., soluble in 95 per cent ethanol and carbon tetrachloride, and insoluble in kerosene. The solubility of this salt in water at 25° C. was 0.02 gram per 100 grams of solution. The saturated aqueous solution had a pH of 6.13.

EXAMPLE 12—N-[3-(4-CHLOROPHENOXY)-2-METHYL-PROPYL]CYCLOHEXYLAMINE SALT OF 2-CYCLOHEXYL-4.6-DINITRO-PHENOL 13.3 grams (0.05 mole) of 2-cyclohexyl-4.6-dinitro-phenol was mixed with 14.1 grams (0.05 mole) of N-[3-(4-chlorophenoxy)-2-methylpropyl]cyclohexylamine. Heat was evolved and a viscous orange dispersion formed in the reaction mixture. The crude mixture was then dissolved in 50 milliliters of hot 95 per cent ethanol and thereafter stored at 0°-5° C. for five days. The resultant crystalline precipitate was recovered by filtration, washed with cold ethanol, and air-dried to obtain 18.5 grams of the N-[3-(4-chlorophenoxy)-2-methyl-propyl)]cyclohexylamine salt of 2-cyclohexyl-4.6-dinitro-phenol as a yellow crystalline material melting at 130°-133° C., soluble in ethanol, carbon tetrachloride, and hot kerosene, and insoluble in cold kerosene. In water at 25° C. this salt compound was soluble to the extent of 0.0186 gram per 100 grams of solution. The pH of the saturated aqueous solution at this temperature was 6.53.

EXAMPLE 13

In a similar fashion other dinitrophenols may be reacted with suitable amine compounds to produce addition salts falling within the scope of the present invention. The following are representative:

Beta-(4-chlorophenoxy)-beta'-cyclohexylamino-diethyl ether salt of 2-cyclohexyl-4.6-dinitro-phenol, a yellow crystalline compound melting at 111°-113° C., soluble in 95 per cent ethanol and carbon tetrachloride, and insoluble in kerosene. The solubility of this salt in water at 25° C. was 0.0095 gram per 100 grams of solution. The pH of the saturated water solution at this temperature was 6.32.

Beta-phenoxy-beta'-cyclohexylamino-diethyl ether salt of 2-cyclohexyl-4.6-dinitro-phenol, a bright yellow crystalline compound melting at 126°-127° C., soluble in 95 per cent ethanol and carbon tetrachloride, and insoluble in kerosene. This compound is soluble in water to the extent of 0.0108 gram per 100 grams of solution at 25° C. The pH of the saturated aqueous solution is 6.17.

Beta-(4-chlorophenoxy)-beta'-cyclohexylamino-diethyl ether salt of 2-secondarybutyl-4.6-dinitro-phenol, a bright yellow crystalline compound melting at 110°–112° C., soluble in 95 per cent ethanol and carbon tetrachloride, and insoluble in kerosene. The solubility of this salt in water at 25° C. is 0.0152 gram per 100 grams of solution. The pH of the saturated aqueous solution is 6.23.

N-[3-(4-tertiarybutyl-phenoxy)-2-methylpropyl] cyclohexylamine salt of 2-secondarybutyl-4.6-dinitro-phenol, a red-orange crystalline solid melting at 129°–132° C., soluble in 95 per cent ethanol, carbon tetrachloride, and hot kerosene, and insoluble in cold kerosene. At 25° C. this salt was soluble in water to the extent of 0.006 gram per 100 grams of solution. The pH of the saturated aqueous solution was 6.4.

N-[3-(4-chlorophenoxy)-2-methyl-propyl]-cyclohexylamine salt of 2-secondarybutyl-4.6-dinitro-phenol, a bright orange crystalline salt melting at 120°–122° C., soluble in 95 per cent ethanol, carbon tetrachloride, and hot kerosene, and insoluble in cold kerosene. This compound is soluble in water at 25° C. to the extent of 0.0031 gram per 100 grams of solution. The pH of the saturated aqueous solution at this temperature was 6.28.

N-[3-(4-tertiarybutyl-phenoxy)-2-methylpropyl] cyclohexylamine salt of 2-cyclohexyl-4.6-dinitro-phenol, a bright orange crystalline salt melting at 136.5°–138.5° C. and soluble in 95 per cent ethanol, carbon tetrachloride, and kerosene. The solubility of the compound in water at 25° C. was 0.0078 gram per 100 grams of solution. The pH of the saturated aqueous solution was 6.47.

The amine salt of the dinitrophenols described above are relatively non-toxic to humans as compared with many inorganic fungicides and insecticides containing lead, mercury, cyanide, copper, arsenic, etc., as at present employed. They are substantially non-explosive and difficultly flammable. Numerous instances in which they have been contacted with the skins of humans indicates that they are relatively non-corrosive and not inclined to produce dermatitis.

We claim:

1. An insecticidal and fungicidal composition comprising an inert diluent and as an active ingredient a compound of the formula

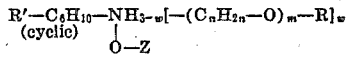

wherein R represents an aromatic radical of the benzene series, R' is selected from the class consisting of alkyl radicals containing from 1 to 8 carbon atoms, inclusive, phenyl, cyclohexyl, and hydrogen radicals, $w$ is an integer not greater than 2, $m$ is an integer not greater than 4, $n$ is an integer from 2 to 4, inclusive, and —O—Z represents a substituted phenoxy radical derived from a phenol of the benzene series characterized by nuclear-substituted nitro groups in the para-position and in one of the positions ortho- to the hydroxyl radical.

2. An insecticidal and fungicidal composition comprising an inert diluent and as an active ingredient a compound of the formula

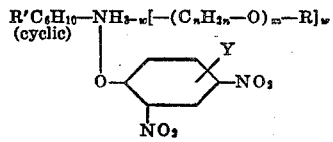

wherein R represents an aromatic radical of the benzene series, R' is selected from the class consisting of alkyl radicals containing from 1 to 8 carbon atoms, inclusive, phenyl, cyclohexyl, and hydrogen radicals, $w$ is an integer not greater than 2, $m$ is an integer not greater than 4, $n$ is an integer from 2 to 4, inclusive, and Y represents a member of the group consisting of phenyl, cyclohexyl, and alkyl radicals containing from 1 to 8 carbon atoms, inclusive.

3. An insecticidal and fungicidal composition comprising an inert diluent and as an active ingredient a compound of the formula

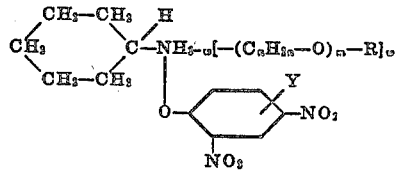

wherein R represents an aromatic radical of the benzene series, $w$ is an integer not greater than 2, $m$ is an integer not greater than 4, $n$ is an integer from 2 to 4, inclusive, and Y represents a member of the group consisting of phenyl, cyclohexyl, and alkyl radicals containing from 1 to 8 carbon atoms, inclusive.

4. An insecticidal and fungicidal composition comprising an inert diluent and as an active ingredient a compound of the formula

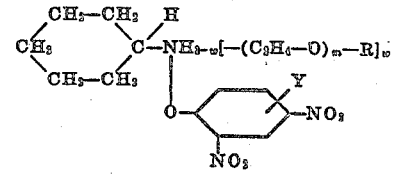

wherein R represents an aromatic radical of the benzene series, $w$ is an integer not greater than 2, $m$ is an integer not greater than 4, and Y represents a member of the group consisting of phenyl, cyclohexyl, and alkyl radicals containing from 1 to 8 carbon atoms, inclusive.

5. An insecticidal and fungicidal composition comprising an inert diluent and as an active ingredient a compound of the formula

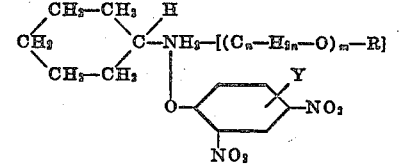

wherein R represents an aromatic radical of the benzene series, $m$ is an integer not greater than 4, $n$ is an integer from 2 to 4, inclusive, and Y represents a member of the group consisting of phenyl, cyclohexyl, and alkyl radicals containing from 1 to 8 carbon atoms, inclusive.

6. An insecticidal and fungicidal composition comprising an inert diluent and as an active ingredient a compound of the formula

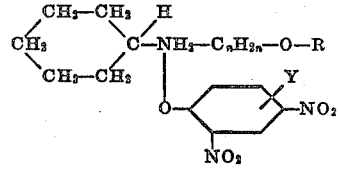

wherein R represents an aromatic radical of the benzene series, $n$ is an integer from 2 to 4, inclusive, and Y represents a member of the group consisting of phenyl, cyclohexyl, and alkyl radicals containing from 1 to 8 carbon atoms, inclusive.

7. An insecticidal and fungicidal composition comprising an inert diluent and as an active ingredient a compound of the formula

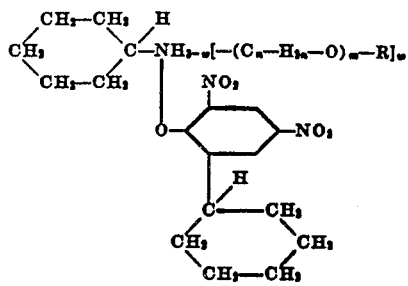

wherein R represents an aromatic radical of the benzene series, $w$ is an integer not greater than 2, $m$ is an integer not greater than 4, and $n$ is an integer from 2 to 4, inclusive.

8. An insecticidal and fungicidal composition comprising an inert diluent and as an active ingredient a compound of the formula

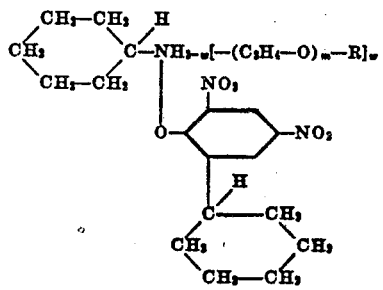

wherein R represents an aromatic radical of the benzene series, $w$ is an integer not greater than 2, and $m$ is an integer not greater than 4.

9. An insecticidal and fungicidal composition comprising an inert diluent and as an active ingredient a compound of the formula

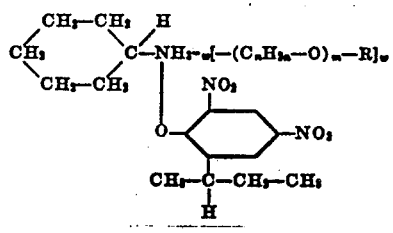

wherein R represents an aromatic radical of the benzene series, $w$ is an integer not greater than 2, $m$ is an integer not greater than 4, and $n$ is an integer from 2 to 4, inclusive.

10. An insecticidal and fungicidal composition comprising an inert diluent and as an active ingredient a compound of the formula

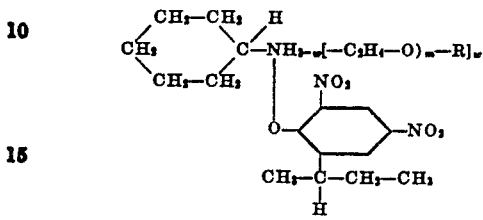

wherein R represents an aromatic radical of the benzene series, $w$ is an integer not greater than 2, and $m$ is an integer not greater than 4.

11. An amine salt having insecticidal and fungicidal properties and characterized by the formula

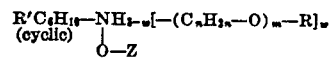

wherein R represents an aromatic radical of the benzene series, R' is selected from the class consisting of alkyl radicals containing from 1 to 8 carbon atoms, inclusive, phenyl, cyclohexyl, and hydrogen radicals, $w$ is an integer not greater than 2, $m$ is an integer not greater than 4, $n$ is an integer from 2 to 4, inclusive, and —O—Z represents a substituted phenoxy radical derived from a phenol of the benzene series characterized by nuclear-substituted nitro groups in the para-position and in one of the positions ortho- to the hydroxyl radical.

GERALD H. COLEMAN.
GERALD A. GRIESS.

---

CERTIFICATE OF CORRECTION.

Patent No. 2,365,056. December 12, 1944.

GERALD H. COLEMAN, ET AL.

It is hereby certified that error appears in the printed specification of the above numbered patent requiring correction as follows: Page 1, second column, line 17, for "R'S$_6$H$_{10}$" read --R'C$_6$H$_{10}$--; page 4, first column, line 40, after "101°-103.5°" insert --C--; and that the said Letters Patent should be read with this correction therein that the same may conform to the record of the case in the Patent Office.

Signed and sealed this 24th day of April, A. D. 1945.

Leslie Frazer (Seal) Acting Commissioner of Patents.